United States Patent
Um

[19]

[11] Patent Number: 5,917,559
[45] Date of Patent: Jun. 29, 1999

[54] DIGITAL VIDEO DATA DECODING APPARATUS AND CONTROL METHOD THEREFOR

[75] Inventor: In-Yong Um, Songnam-si, Rep. of Korea

[73] Assignee: Hyundai Electronics Ind. Co., Ltd., Kyounggi-do, Rep. of Korea

[21] Appl. No.: 08/663,748

[22] Filed: Jun. 14, 1996

[30] Foreign Application Priority Data

Jun. 30, 1995 [KR] Rep. of Korea .................. 1995-18791

[51] Int. Cl.$^6$ ................................ H04N 7/12; G11B 5/09
[52] U.S. Cl. ......................... 348/845.3; 369/47; 369/59; 386/40; 386/124
[58] Field of Search ..................................... 348/500, 423, 348/845.1, 845.2, 845.3, 845, 465, 466; 386/124, 40, 125, 126; 360/32, 40, 48; 369/48, 47, 51, 50, 54, 59; 375/354, 365, 368; H04N 7/12

[56] References Cited

U.S. PATENT DOCUMENTS

| | | |
|---|---|---|
| 4,841,513 | 6/1989 | Farhangi et al. ........................ 369/59 |
| 4,949,323 | 8/1990 | Yoshida ...................................... 369/32 |
| 5,218,590 | 6/1993 | Miyasaka .................................. 369/54 |
| 5,414,686 | 5/1995 | Iitsuka ....................................... 369/48 |
| 5,508,989 | 4/1996 | Funahashi et al. ....................... 369/58 |

*Primary Examiner*—Michael Lee
*Attorney, Agent, or Firm*—Whitham, Curtis & Whitham

[57] ABSTRACT

A digital video data decoding apparatus and a control method therefor are disclosed. A plurality of synchronization patterns are stored, and the synchronization pattern of the reproduced incoming data is compared with a stored synchronization pattern. Therefore, even if the synchronization pattern is altered, the altered synchronization pattern can be detected. Further, the header data and the user data can be extracted from the error-corrected data, and they are stored in the header data buffer and the user data buffer. Then they are outputted directly to the system by utilizing the direct memory accessing section. Consequently, the data processing amount of the CPU is reduced, thereby improving the data processing speed.

4 Claims, 4 Drawing Sheets

DIGITAL VIDEO DATA DECODING APPARATUS AND CONTROL METHOD THEREFOR

BACKGROUND OF THE INVENTION

1. Field of the Invention

The present invention relates to a digital video data decoding apparatus and a control method therefor, in which various synchronization patterns are stored, so that data can be detected even if the synchronization patterns are varied.

2. Description of the Prior Art

FIG. 1 is a block diagram showing the constitution of the general digital video disc player.

A mechanism control section 17 controls a CLV (constant linear velocity) servo 12, a laser diode driving section 13 and a focus track servo 14, so that an optical system 10 can read data signals from a disc CD.

The signals which the optical system 10 has read from the disc CD are amplified by an amplifier 11, and are made to pass through a clock and data detecting section 15, thereby making it possible to detect data. The detected digital data are synchronization-detected and are compensated by a synchronization pattern and data compensating section so as to be inputted into a demodulator 19. The data are demodulated by the demodulator 19, and are inputted into an error correcting section 21 so as to be corrected by an RSCS (reed-solomon product code). Then the data are decoded by a data decoder 22 so as to be outputted to the system.

In the above described conventional decoding apparatus, only a single synchronization pattern can be detected, and therefore, if the synchronization pattern is changed, the data cannot be detected.

SUMMARY OF THE INVENTION

The present invention is intended to overcome the above described disadvantages of the conventional technique.

Therefore it is an object of the present invention to provide a digital video data decoding apparatus and a control method therefor, in which a plurality of synchronization patterns are stored into a memory in advance, then the incoming synchronization patterns are read out, and then, the synchronizations are detected in accordance with the synchronization patterns of the reproduced data so as to match the synchronization.

It is another object of the present invention to provide a digital video data decoding apparatus and a method therefor, in which header data and user data are detected from the error-corrected data, then the detected data are stored into a header data buffer and a user data buffer, and then the memory is directly accessed so as to transmit the header data and the user data to the system.

In achieving the above objects, the digital video data decoding apparatus according to the present invention includes:

a synchronization pattern detecting and generating section holding a plurality of synchronizing signals, and for generating synchronizing signals fitting to the incoming data format so as to detect the synchronizing signals of the incoming data; a sequence control section for extracting header data and user data from the incoming data; a buffer section for storing the output header data and the output user data of the sequence control section; a CRC processing section for checking the existence or absence of errors in the inputted data so as to compensate them;

and a direct memory accessing section for outputting the header data, the user data and the error-compensated data without passing through a central control section (CPU).

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
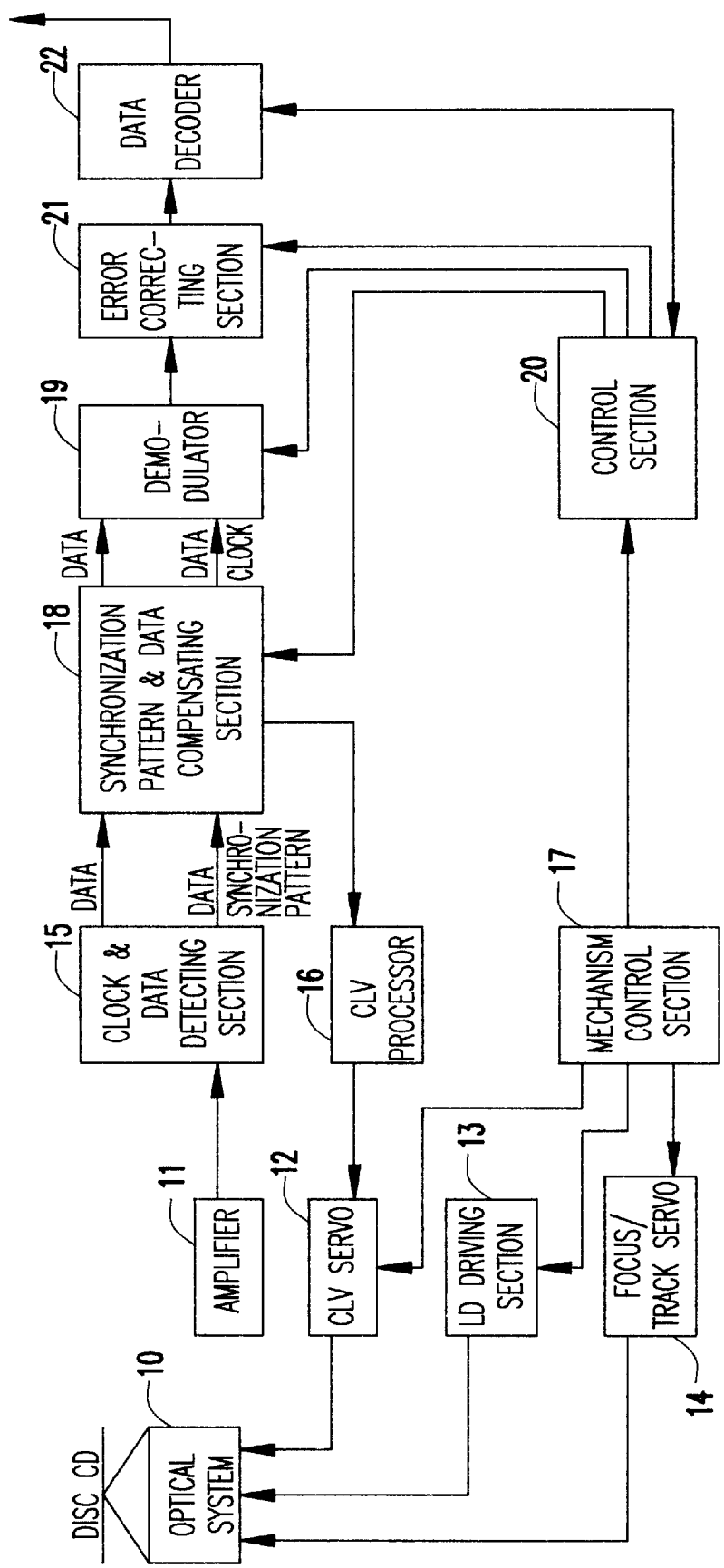
FIG. 1 is a block diagram showing the constitution of the general digital video disc player.
Figure 2:
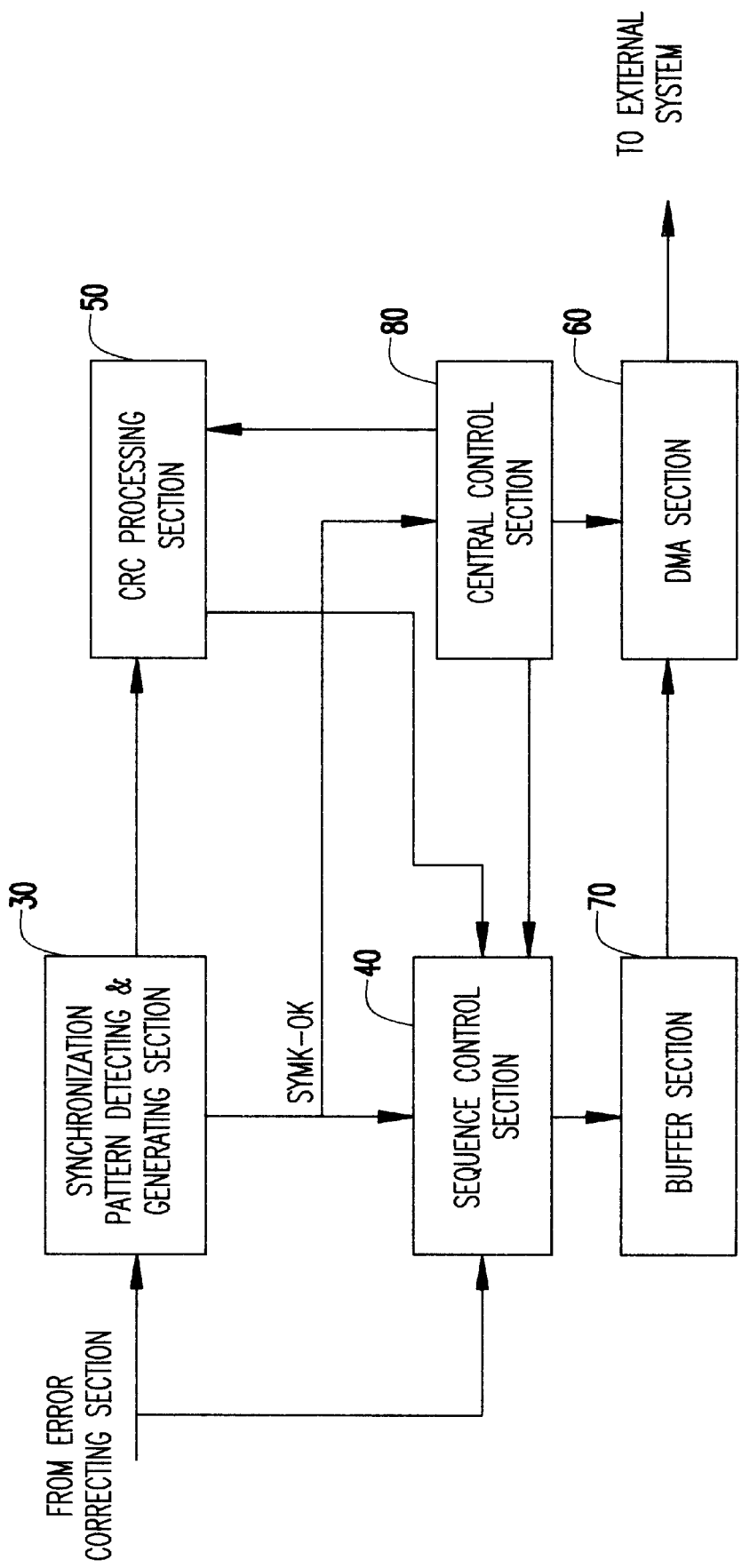
FIG. 2 is a block diagram showing the constitution of the digital video data decoding apparatus according to the present invention.

FIG. 2 is a block diagram showing the constitution of the digital video data decoding apparatus according to the present invention.

An error correcting section 21 corrects errors of the data, and the error-corrected output data of the error correcting section 21 are inputted into a synchronization pattern detecting and generating section 30, into a CRC processing section 50 and into a sequence control section 40. The synchronization pattern detecting and generating section 30 holds a plurality of synchronizing signals in its data storing device (e.g., register), and generates synchronizing signals fitting to the incoming data format so as to detect synchronizing signals from the incoming data. The sequence control section 40 extracts header data and user data from the incoming data. A buffer section 70 stores the output header data and the output user data of the sequence control section 40. The CRC processing section 50 receives the synchronization patterns from the synchronization pattern detecting and generating section 30, and CRC-checks the incoming data from the error correcting section 21 so as to detect the existence or absence of errors in the data, and so as to compensate the errors. A direct memory accessing (DMA) section 60 outputs the header data, the user data and the error-compensated data of the buffer section 70 directly to an external system without passing through a central control section (CPU). The central control section 80 controls the synchronization pattern detecting and generating section 30 so as for the section 30 to detect the synchronization patterns. The detected synchronization patterns are utilized in extracting the header data and the user data by the sequence control section 40, and in correcting the errors by the CRC processing section 50. Then the data are outputted through the direct memory accessing (DNA) section 60 to an external system.

Figure 3:
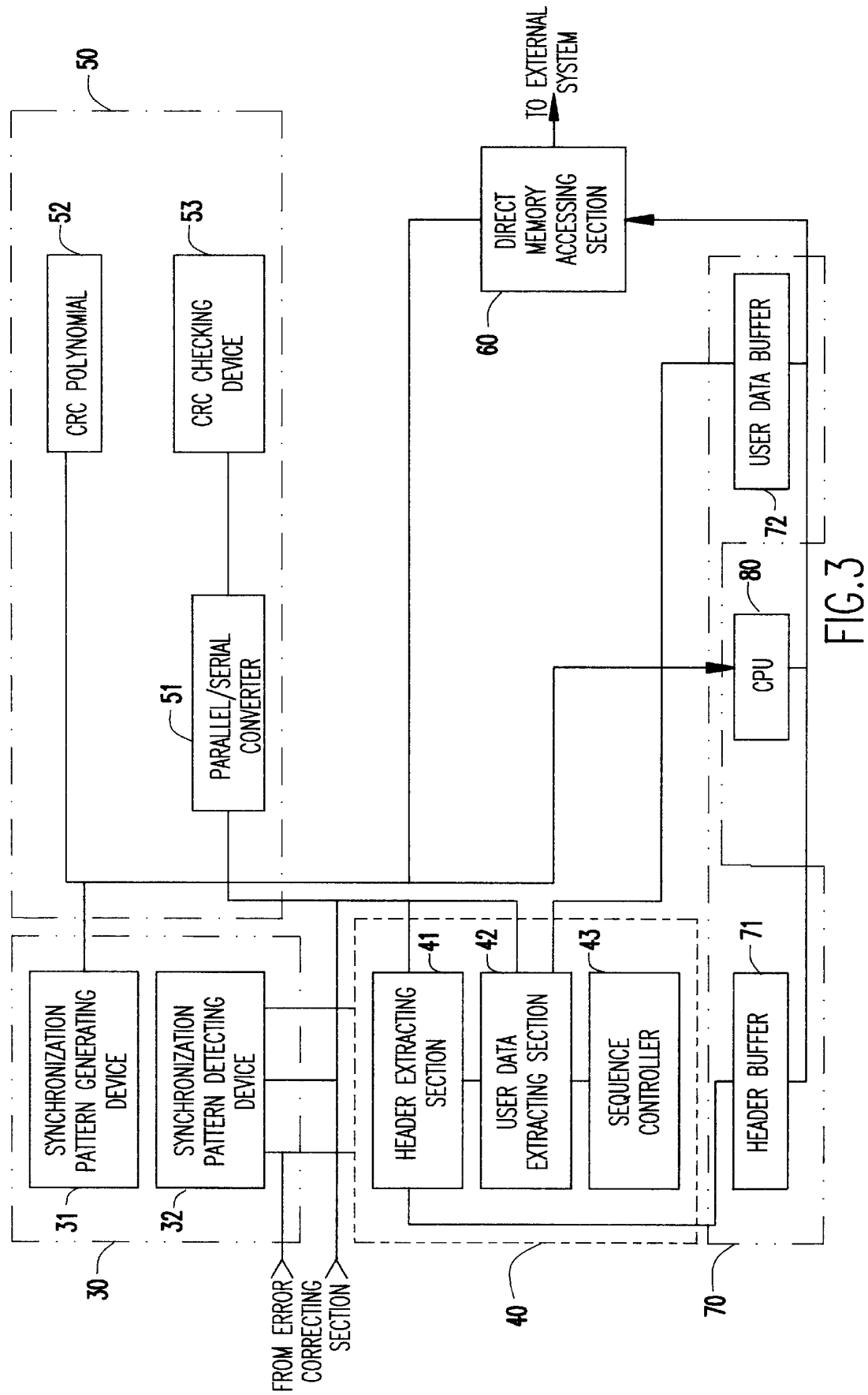
FIG. 3 is a block diagram showing the constitution of a data decoder according to the present invention.

FIG. 3 is a block diagram showing the constitution of a data decoder according to the present invention.

The error correcting section 21 corrects the errors of the data (for example, corrects the errors by applying the cross interleave reed solomon method), and then, the corrected data are inputted into the synchronization pattern detecting and generating section 30. The synchronization pattern detecting and generating section 30 includes a synchronization pattern generating device 31 and a synchronization pattern detecting device 32, while the synchronization pattern generating device 31 stores a plurality of frame synchronizing signals. The synchronization pattern generating device 31 outputs frame synchronizing signals to the synchronization pattern detecting device 32, so that the corresponding synchronization patterns contained in the inputted signals can be detected.

The synchronization patterns are inputted into the sequence control section 40. The sequence control section 40 includes: a header extracting section 41, a user data extracting section 42 and a sequence controller 43. The header extracting section 41 extracts headers from the output data of the error correcting section 21 by utilizing the synchronization patterns. The user data extracting section 42 extracts user data from the output data of the error correcting section 21.

The user data extracting section 42 and the header extracting section 41 respectively store the header data and the user data into a header buffer 71 and a user data buffer 72 under the control of the central control section (CPU) 80.

Meanwhile, the data which have been outputted from the synchronization pattern detecting and generating section 30 are inputted into the CRC processing section 50. The CRC processing section 50 includes a parallel/serial converter 51, a CRC polynomial storing section 52 and a CRC checking device 53. The parallel data which are inputted from the synchronization pattern detecting and generating section 30 are converted to serial data by the parallel/serial converter 51 so as to be inputted into the CRC checking device 53. The CRC checking device 53 CRC-checks one frame of the serial data by utilizing the CRC polynomial of the CRC polynomial storing section 52.

The CRC-checked data which are outputted from the CRC checking device 53, and the header data and the user data which are stored in the buffer section 70, are outputted through the direct memory accessing section 60 to the external system.

Figure 4:
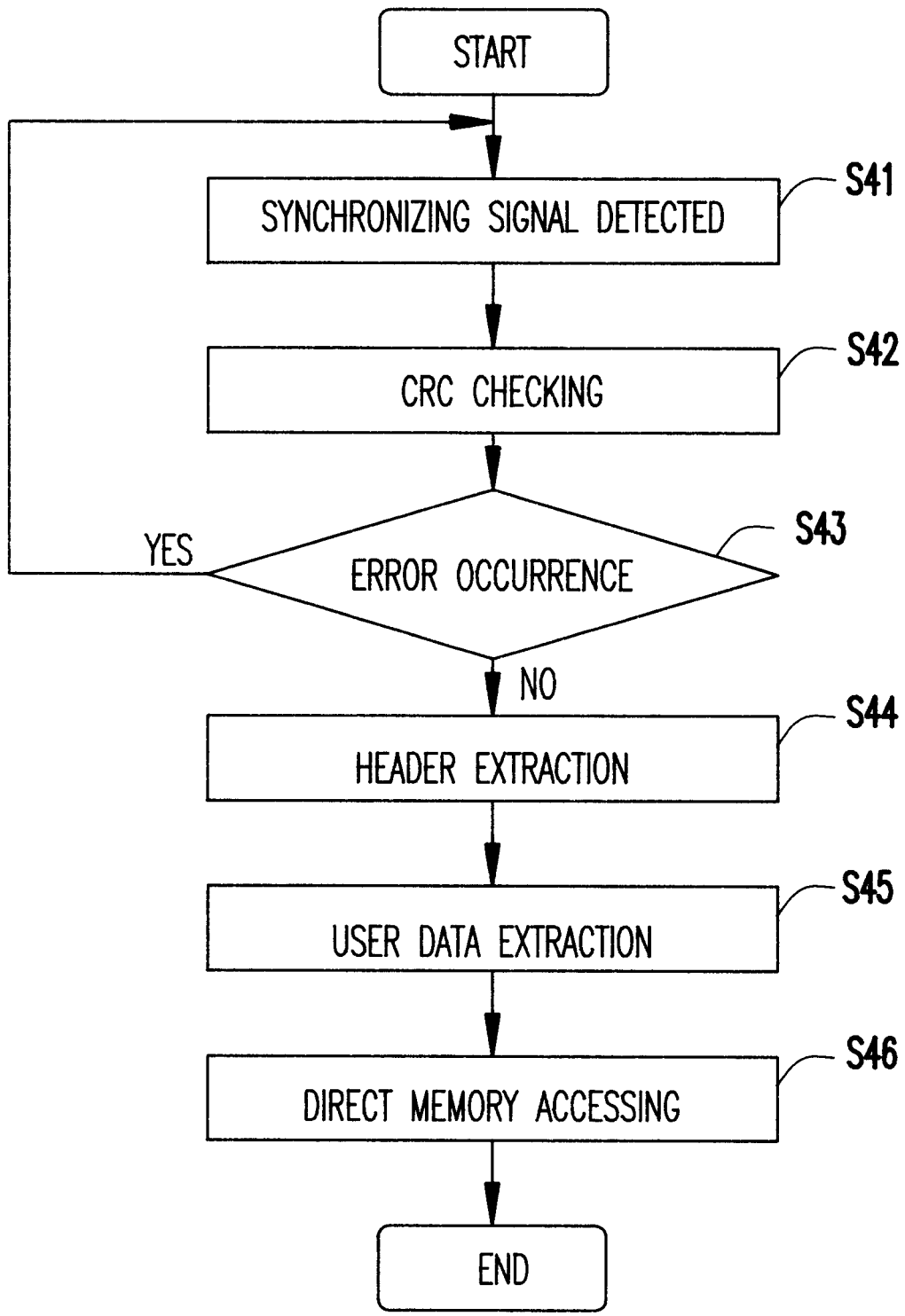
FIG. 4 is a flow chart showing the constitution of the control method for the digital video data decoder according to the present invention.

FIG. 4 is a flow chart showing the constitution of the control method for the digital video data decoder according to the present invention.

At a step S41, a data amount of certain bits (e.g., 8 bits) which are selected from the data of the error correcting section 21 is compared with the synchronization pattern which is stored in the synchronization pattern generating device 31. If it is same with the latter, then it is adopted as a synchronizing signal so as to detect synchronizing signals. At a step S42, the data which have been inputted from the error correcting section 21 are CRC-checked by the CRC processing section 50 by utilizing the detected synchronizing signals. At a step S45, a judgment is made as to whether an error has been found as the result of the CRC-checking at the preceding step. If an error is found, the step S41 is repeated. If an error has not been found, the operation proceeds to a step S43.

At a step S43, the header data are extracted from the data of the error correcting section 21 by utilizing the detected synchronizing signals so as to store them into the header buffer 71 of the buffer section 70. At a step S44, in the same manner, the user data are extracted so as to store them into the user data buffer 72.

At a step S46, the CRC-checked data, and the data of the header buffer 71 and the user data buffer 72 are outputted to the external system.

According to the present invention as described above, even if the synchronization pattern is altered in the data which is reproduced from a video disc, the altered synchronization pattern can be detected, and the data can be processed in accordance with the detected synchronization pattern. Further, the header data and the user data can be extracted from the error-corrected data, and they are stored in the header data buffer and the user data buffer respectively. Then they are outputted to the system by utilizing the direct memory accessing section. Consequently, the data processing amount of the CPU is reduced, thereby improving the data processing speed.

What is claimed is:

1. A digital video data decoding apparatus comprising:
a synchronization pattern detecting and generating section which holds a plurality of synchronizing signals and generates synchronizing signals fitting to an incoming data format so as to detect the synchronization patterns of the incoming data;
a sequence control section which extracts header data and user data from the incoming data;
a buffer section which stores the extracted header data and user data from said sequence controller;
a CRC processing section which checks existence or absence of errors in the incoming data and which outputs data compensated for the errors;
a central control section for controlling the above sections; and
a direct memory accessing section which outputs the header data, the user data, and the error-compensated data to an external system without passing through the central control section.

2. The digital video data decoding apparatus as claimed in claim 1, wherein said central control section detects synchronization patterns by controlling the synchronization pattern detecting and generating section, extracts the header data and user data from the sequence control section by utilizing the detected synchronization patterns so as to store the detected synchronization patterns into the buffer section, makes the CRC processing section correct errors by utilizing the detected synchronization patterns, and controls the direct memory accessing section to directly pass the error-corrected data and the header data and the user data of the buffer section to said external system.

3. A control method for a digital video data decoding apparatus, comprising the steps of:
comparing a data of a certain bit amount of reproduced incoming data with a plurality of synchronization patterns of a synchronization pattern generating device,
adopting as a synchronization signal one of said plurality of synchronization patterns which corresponds to said reproduced incoming data so as to detect synchronization signals, extracting header data and user data from the reproduced incoming data by utilizing the detected synchronizing signals so as to store the header data and user data in a buffer section;

CRC-checking the data from a CRC processing section by utilizing the detected synchronization signals, repeating the synchronizing signal detecting step upon finding an error in the CRC-checking, and proceeding to a next step upon finding no error; and outputting the CRC-checked data and the data of said buffer section through a direct memory accessing.

4. A digital video data decoding apparatus comprising:

a synchronization pattern detecting and generating means for holding a plurality of synchronizing signals and for generating synchronizing signals fitting to an incoming data format so as to detect synchronization patterns of the incoming data;

a sequence control means for extracting header data and user data from the incoming data;

a buffer for storing the extracted header data and user data from said sequence control means;

a CRC processing means for checking existence or absence of errors in the incoming data and for outputting data compensated for the errors; and a direct memory accessing means for outputting the header data, the user data, and the error-compensated data to an external system without passing through a central control means.

* * * * *